May 9, 1967 E. A. CHANDROSS ETAL 3,319,132
ELECTROLUMINESCENT DEVICE CONTAINING LUMINESCENT ELECTROLYTE
Filed Aug. 18, 1964
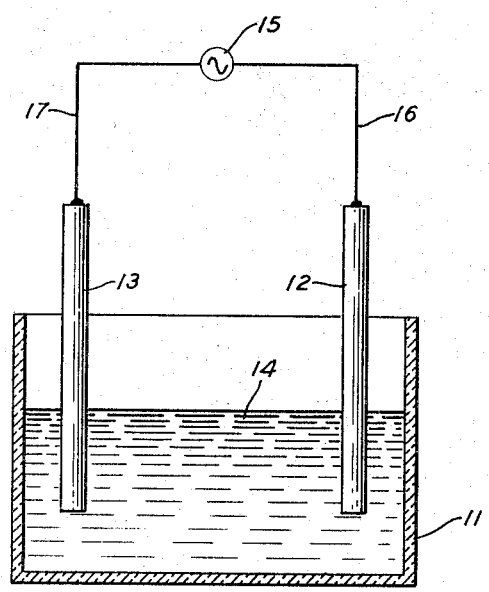
INVENTORS E. A. CHANDROSS
R. E. VISCO
BY
ATTORNEY

3,319,132
ELECTROLUMINESCENT DEVICE CONTAINING LUMINESCENT ELECTROLYTE
Edwin A. Chandross, Murray Hill, and Robert E. Visco, New Providence, N.J., assignors to Bell Telephone Laboratories, Incorporated, New York, N.Y., a corporation of New York
Filed Aug. 18, 1964, Ser. No. 390,458
6 Claims. (Cl. 317—230)

This invention relates to a method for generating chemiluminescence. More particularly, the present invention relates to a method for producing chemiluminescence from electrogenerated positive and negative ions derived from condensed polynuclear aromatic hydrocarbons at low applied voltages and to the electroluminescent devices.

It has long been recognized that the dicharge of the positive ion of a potentially fluorescent organic molecule can lead to the emission of fluorescent radiation. Similarly, it has been recognized that the loss of an electron from the anion of a fluorescent material can also lead to the emission of radiation.

It has now been discovered that these two phenomena may be simultaneously effected in the same medium by A.-C. electrolysis, the subsequent chemical reaction leading to electroluminescence in the visible region which is of particular interest in diverse industrial applications, for example, for use in conjunction with solid state photoconducting detectors as an element in a switching system.

In accordance with the present invention, a technique is described for the preparation of an electroluminescent cell operating on alternating current at applied peak to peak voltages ranging down to as low as 3.5 volts which emits bright chemiluminescence in an aprotic solvent from the reaction between positive and negative ions derived from polynuclear condensed aromatic hydrocarbons selected from the group consisting of (a)

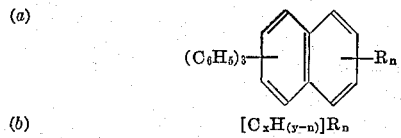

(b) $[C_xH_{(y-n)}]R_n$ wherein $x$ is within the range of 14–20, $y$ is within the range of 10–12 and wherein R represents at least one member selected from among hydrogen, lower alkyl groups having from 1–4 carbon atoms, tertiary amine groups having up to 4 carbon atoms, amine groups, phenyl groups, aryloxy groups and substituted phenyl groups, bearing any of the above noted substituents, and $n$ is an integer from 1–4.

The invention will be more readily understood by reference to the following detailed description taken in conjunction with the accompanying drawing wherein:

The figure is a diagrammatical representation of a device in accordance with the invention.

With reference now more particularly to the figure there is shown a typical electroluminescent device in accordance with the invention. Shown in the figure is a container 11 including a pair of electrodes 12 and 13 and a solution 14 of a polynuclear condensed aromatic hydrocarbon in an aprotic solvent, the electrodes and container being chemically inert with respect to the solution. The device shown also includes a source of alternating current 15 connected to electrodes 12 and 13 by means of leads 16 and 17 respectively.

A general outline of the technique employed in accordance with the present invention is set forth below. Certain operating parameters and ranges as well as the type of materials employed are indicated.

The first step in the inventive procedure involves selecting a suitable polynuclear condensed aromatic hydrocarbon of the type described above. The most effective results are obtained with anthracene, naphthacene, perylene and chrysene and derivatives thereof. Materials found particularly useful in the practice of the present invention are 1,2,3-triphenylnaphthalene
9,10-diphenylanthracene
9,10-di-p-anisylanthracene
5,6,11,12-tetraphenylnaphthacene
naphthacene
perylene The next step involves the preparation of a solution, including a solvent for the aromatic hydrocarbon, having a concentration of at least $1 \times 10^{-4}$ moles/liter, the upper limit being determined by solubility. In order to avoid destruction of the active component of the electro-luminescent cell, it is necessary to employ an aprotic solvent, that is, one with no available protons since the electrogenerated negative ions react rapidly with the protons. Materials found particularly suitable in this use are N,N-dimethylformamide, acetonitrile, acetone and N-methylpyrrolidone.

Following the preparation of the aromatic solution, an inert conducting salt is added for the purpose of reducing the solution resistance. It has been determined that such salt should be added in an amount approximately equal to or greater than 0.05 mole/liter, the lower limit being dictated by the maximum desirable power dissipation in the cell whereas the upper limit is determined by solubility. Material found suitable in the use are tetra-alkyl ammonium perchlorates or chlorides and alkali metal, other than lithium, perchlorate or chlorides.

The temperature of the system may range from 50° C. down to approximately the freezing point of the solvent.

The only elements now remaining before completion of the novel electroluminescent cell are the electrodes. However, in certain instances, it may be desirable at this point to purge the solution of oxygen by bubbling nitrogen therethrough. Next, the electrodes which may be comprised of any commercially available material suitable for this purpose are inserted. Helices, wires, planes and rods may be employed in this use. Platinum, gold or carbon have been found particularly efficacious as electrodes.

Thereafter, an alternating current having a Faradaic current density measured at either electrode ranging from 0.1 to 100 milliamperes per square centimeter as a voltage having a frequency of 0.1 to 10,000 cycles per second is applied to the cell, so resulting in the emission of bright fluorescence as determined visually or with the use of a photomultiplier. In addition to the Faradaic current density, there is a second current component which is necessary to charge or discharge the electrical double layer. It has been determined that the use of current densities appreciably in excess of the noted maximum results in breakdown of the solvent whereas the use of current densities appreciably below the noted minimum fails to produce the desired result. It has also been determined that fluorescence occurs at applied peak to peak voltages ranging down to as low as 3.5 volts A.-C., the upper limit of applied voltage being determined by the voltage which is necessary to reach electrode potentials at which the current for the electrochemical reduction of the aromatic hydrocarbon to its radical anion is diffusion controlled. A typical upper limit would be 30 volts.

Several examples of the present invention are described in detail below. These examples are included merely to aid in the understanding of the invention, and variations may be made by one skilled in the art without departing from the spirit and scope of the invention.

Example I

A glass U-tube having a fritted disk sealed across the bottom was employed as the container for the electroluminescent cell. The electrodes employed were coaxial helices of 0.02 inch platinum wire having a total area of approximately 1 square centimeter. The first step involved adding 25 milliliters of a solution of 9,10-diphenylanthracene having a concentration of $40 \times 10^{-3}$ moles/liter in N,N-dimethylformamide to the glass tube. Next, 10 milliliters of a solution of a supporting electrolyte comprising tetra-n-propylammonium perchlorate having a concentration of approximately 0.1 mole/liter was added to the system, so resulting in a cell resistance of approximately 37 ohms. Following, nitrogen was passed through the system in order to avoid entry of oxygen and water and also served as a stirring mechanism. Finally, with an 8 volt signal A.-C. applied to the system at 200 cycles per second a current of 60 milliamperes was drawn, so resulting in the emission of visible bright blue fluorescence which was determined spectrophotometrically as being identical to the normal fluorescence of 9,10-diphenylanthracene.

Example II

The procedure of Example I was repeated with the exception that the frequency of the signal passed through the system was 20 cycles per second, a current of 80 milliamperes being drawn. The resultant blue fluorescence was observed visually.

Example III

The procedure of Example I was repeated with the exception that a 15 volt signal at a frequency of 60 cycles per second was employed, a total current of 0.4 ampere being drawn. The resultant blue fluorescence was observed visually.

Example IV

The procedure of Example I was repeated employing 25 milliliters of a solution comprising anthracene having a concentration of $40 \times 10^{-3}$ moles/liter in N,N-dimethylformamide. The resultant blue fluorescence was observed visually.

Example V

The procedure of Example I was repeated employing 25 milliliters of a solution comprising naphthacene having a concentration of $10 \times 10^{-3}$ moles/liter in N,N-dimethylformamide. The resultant green fluorescence was observed visually.

Example VI

The procedure of Example I was repeated employing as a solvent (a) acetonitrile, (b) acetone, (c) 1,2-dimethoxyethane and (d) N-methylpyrrolidone. In each case the result was identical.

Example VII

The procedure of Example I was repeated employing 25 milliliters of a solution comprising 5,6,11,12-tetraphenylnaphthacene having a concentration of $1 \times 10^{-3}$ moles/liter in N,N-dimethylformamide. The resultant yellow fluorescence was observed visually.

Example VIII

The procedure of Example I was repeated employing 25 milliliters of a solution comprising perylene having a concentration of $10 \times 10^{-3}$ moles/liter in N,N-dimethylformamide. The resultant blue fluorescence was observed visually.

Example IX

The procedure of Example I was repeated employing 25 milliliters of a solution comprising chrysene having a concentration of $10 \times 10^{-3}$ moles/liter in N,N,-dimethylformamide. The resultant blue fluorescence was observed visually.

While the invention has been described in detail in the foregoing description, the aforesaid is by way of illustration only and is not restricted in character. The several modifications which will readily suggest themselves to persons skilled in the art are all considered within the broad scope of the invention, reference being had to the appended claims.

What is claimed is:

1. An electroluminescent device including a container having disposed therein a pair of electrodes and a solution of a polynuclear condensed aromatic hydrocarbon in an aprotic solvent, the said aromatic hydrocarbon being selected from the group consisting of (a)

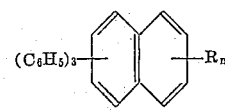

(b)

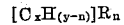

wherein $x$ is within the range of 14–20, $y$ is within the range of 10–20 and wherein R represents at least one member selected from the group consisting of hydrogen, lower alkyl radicals having from 1–4 carbon atoms, tertiary amine radicals having up to 4 carbons, amine groups, aryl radicals, aryloxy groups and substituted aryl radicals wherein such substituent is selected from the group consisting of hydrogen, lower alkyl radicals having from 1–4 carbon atoms, tertiary amine radicals having up to 4 carbon atoms and amine groups, the said electrodes and container being chemically inert with respect to said solution.

2. A device in accordance with claim 1 wherein said solution includes a conducting inert salt in an amount within the range of 0.1–1 mole/liter.

3. A device in accordance with claim 2 wherein said aromatic hydrocarbon is 9,10-diphenylanthracene and said aprotic solvent is N,N-dimethylformamide.

4. A device in accordance with claim 2 wherein said aromatic hydrocarbon is naphthacene.

5. A device in accordance with claim 2 wherein said aromatic hydrocarbon is perylene.

6. A device in accordance with claim 2 wherein said aromatic hydrocarbon is 5,6,11,12-tetraphenyl-naphthacene.

No references cited.

JAMES D. KALLAM, *Primary Examiner.*